United States Patent [19]

Syx

[11] Patent Number: 5,178,369
[45] Date of Patent: Jan. 12, 1993

[54] FENCE VEGETATION BARRIER

[76] Inventor: Dale E. Syx, 427 Florence Ave., Fairborn, Ohio 45324

[21] Appl. No.: 845,962

[22] Filed: Mar. 4, 1992

[51] Int. Cl.$^5$ .............................................. B21F 27/00
[52] U.S. Cl. .......................................... 256/32; 256/1
[58] Field of Search ....................................... 256/1, 32

[56] References Cited

U.S. PATENT DOCUMENTS

| | | | |
|---|---|---|---|
| 3,713,624 | 1/1973 | Niemann | 256/1 X |
| 3,747,897 | 7/1973 | Conley | 256/1 X |
| 3,768,780 | 10/1973 | Cowles et al. | 256/1 |
| 3,806,096 | 4/1974 | Eccleston et al. | 256/1 |
| 3,822,864 | 7/1974 | Keys | 256/1 X |
| 4,497,472 | 2/1985 | Johnson | 256/1 X |
| 4,548,388 | 10/1985 | Cobler | 256/1 X |
| 4,903,947 | 2/1990 | Groves | 256/1 X |

*Primary Examiner*—Andrew V. Kundrat

[57] ABSTRACT

A fence vegetation barrier is essentially a plastic track designed to be positioned along a bottom portion of a fence so as to prevent vegatation growth and facilitate grass cutting with a lawnmower or weed cutter. Various shapes of the barrier are illustrated along with its method of attachment, and in one embodiment, a weed killer system is combined with the barrier. The weed killer comprises a perforated tube with a weed killing powder, and means are provided to collect rain water in the barrier to effect a slow dispensing of the weed killer over a prolonged period of time.

6 Claims, 7 Drawing Sheets

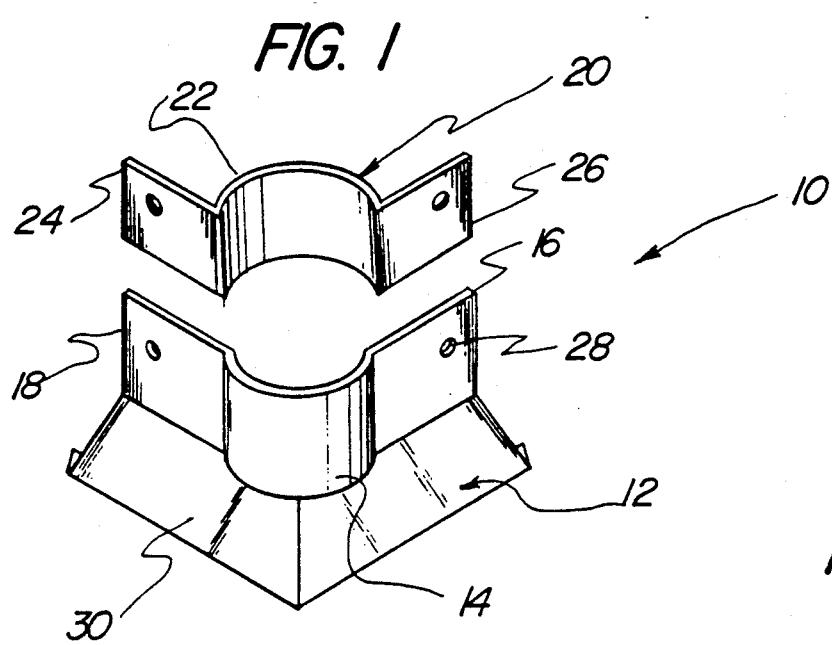
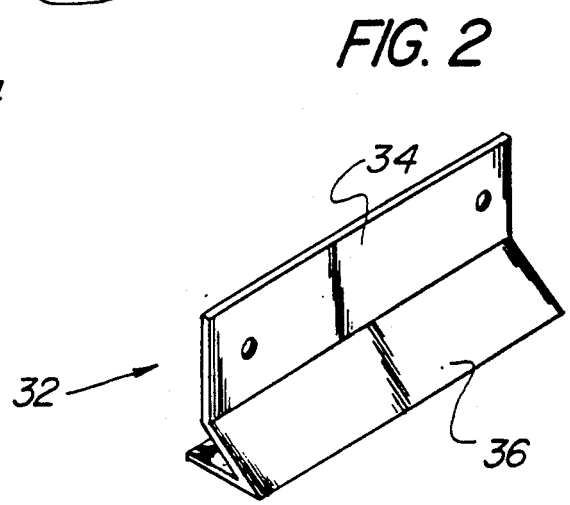
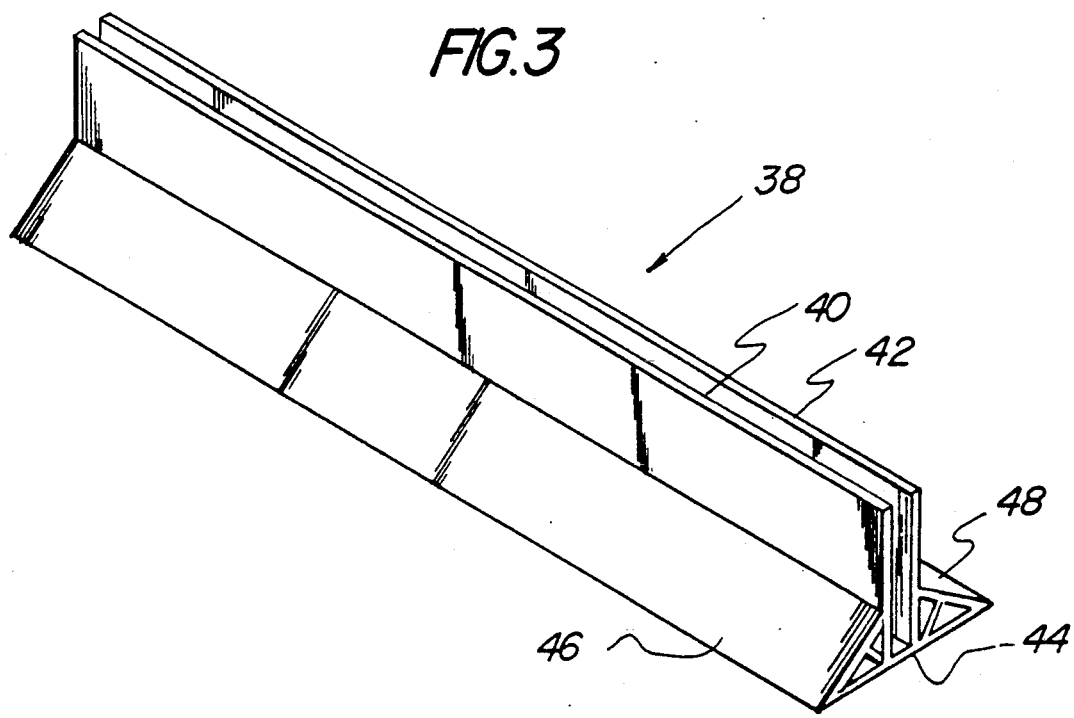

FENCE VEGETATION BARRIER

BACKGROUND OF THE INVENTION

1. Field of the Invention

The present invention relates to fence guards and more particularly pertains to a vegetation barrier which may be positioned along the bottom edge of a fence.

2. Description of the Prior Art

The use of vegetation barriers around fences is well known in the prior art. For example, U.S. Pat. No. 3,713,624, which issued to F. Niemann on Jan. 30, 1973, discloses a fence guard for restricting the growth of grass, weeds and the like directly adjacent to or beneath a fence. The guard essentially comprises a length of material which is L-shaped in cross-section, and a pair of these fence guards are adapted to be affixed together on opposed sides of a fence so as to secure them against displacement.

A similar construction is to be found in U.S. Pat. No. 3,768,780 which issued to Cowles et al on Oct. 30, 1973. This patent discloses a fence border designed to eliminate the need of trimming grass under a fence and consists of a pair of side by side panels interconnected by a spreadable accordion pleat element, thereby to facilitate a positioning of the border beneath the bottom edge of a fence.

Another vegetation barrier of interest is to be found in U.S. Pat. No. 3,806,096 which issued to Eccleston et al on Apr. 23, 1974. This barrier comprises a shell which telescopically receives a core member and is positioned on the ground area to restrict growth of vegetation immediately beneath a fence element.

Also of interest is U.S. Pat. No. 3,822,864 which issued to G. Keys on Jul. 9, 1974 and which is directed to a weed barrier for fencing. In this construction, nestable and telescopic channel shaped members are disposed and secured along the ground beneath fence wire, thereby to inhibit weed and vegetation growth.

A final patent of interest is U.S. Pat. No. 4,497,472 which issued to J. Johnson on Feb. 5, 1985 and which is directed to a vegetation blocking fence edging assembly. A plurality of elongated edging strips are positionable beneath a fence so as to inhibit vegetation growth substantially in the same manner as the above-discussed patents.

As can be appreciated, the above patents illustrate the fact that vegetation guards beneath fencing represent a crowded art which is further indicative of the substantial need for such guards. As such, there is a continuing need for improved forms of such guards whereby they might be more easily installed and more economically manufactured. In this respect, the present invention substantially fulfills this need.

SUMMARY OF THE INVENTION

In view of the foregoing disadvantages inherent in the known types of fence vegetation guards now present in the prior art, the present invention provides an improved fence vegetation guard construction wherein the same can be easily installed to any type of fencing, as well as being easy and economical to manufacture. As such, the general purpose of the present invention, which will be described subsequently in greater detail, is to provide a new and improved fence vegetation guard which has all the advantages of the prior art fence vegetation guards and none of the disadvantages.

To attain this, the present invention essentially comprises a fence vegetation barrier which is essentially a plastic track designed to be positioned along a bottom portion of a fence so as to prevent vegetation growth and facilitate grass cutting with a lawnmower or weed cutter. Various shapes of the barrier are illustrated along with its method of attachment, and in one embodiment, a weed killer system is combined with the barrier. The weed killer comprises a perforated tube with a weed killing powder, and means are provided to collect rain water in the barrier to effect a slow dispensing of the weed killer over a prolonged period of time.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fence vegetation guard which has all the advantages of the prior art fence vegetation guards and none of the disadvantages.

It is another object of the present invention to provide a new and improved fence vegetation guard which may be easily and efficiently manufactured and marketed.

It is a further object of the present invention to provide a new and improved fence vegetation guard which is of a durable and reliable construction.

An even further object of the present invention is to provide a new and improved fence vegetation guard which is susceptible of a low cost of manufacture with regard to both materials and labor, and which accordingly is then susceptible of low prices of sale to the consuming public, thereby making such fence vegetation guards economically available to the buying public.

Still yet another object of the present invention is to provide a new and improved fence vegetation guard which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a first embodiment of fence vegetation guard embodying the principles and concepts of the present invention.

FIG. 2 is a perspective view of a second embodiment of the invention.

FIG. 3 is a perspective view of a third embodiment of the invention.

DESCRIPTION OF THE PREFERRED EMBODIMENTS

Figure 4:
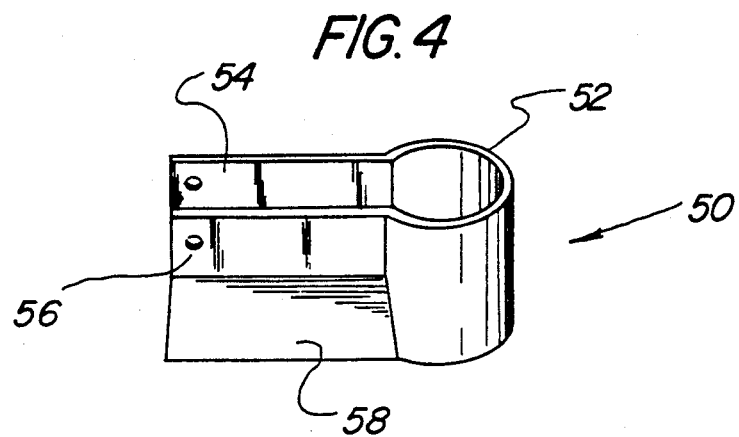
FIG. 4 is a perspective view of a fourth embodiment of the invention.

With reference now to the drawings, and in particular to FIG. 1 thereof, a first embodiment of a new and improved fence vegetation barrier embodying the principles and concepts of the present invention and generally designated by the reference numeral 10 will be described.

More specifically, the guard section 10 illustrated in FIG. 1 would be typically constructed of flexible plastic and is designed as a corner connector. The external corner section 12 is of an integral construction and includes a curvilinear section 14 designed to be positioned around a circular fence post. The section 14 has outwardly extending flanges 16, 18 to facilitate a connection of the section to a interior mating section 20 having a conforming circular section 22 for positioning around an opposed side of the circular fence post. The section 20 also includes integral flanges 24, 26 radiating outwardly from the curved section 22, and these flanges are alignable respectively with the flanges 18, 16 so that threaded fasteners can be positioned through the apertures 28 formed in all four flanges, thus to effect a secure attachment of the assembly 10 to a corner fence post. The exterior section 12 includes a further integral downwardly sloped portion 30 which would extend outwardly from the fence post area and which is designed to prevent vegetation growth while allowing a lawnmower or weed clipper to move therealong when grass trimming is necessary.

FIG. 2 illustrates a modified embodiment of the invention which is generally designated by the reference numeral 32. This embodiment 32 is designed to go along a straight edge of fencing and can be constructive of any length. Its integral molded plastic construction includes an upstanding flange portion 34 and an integral downwardly sloped section 36 which would extend outwardly from the fencing. As with the prior art patents, a pair of these sections 32 would be required for attachment to a fence since one would go on either side of a fence and extend beneath the same with appropriate threaded fasteners then being utilized to connect the opposed pieces together.

FIG. 3 illustrates a further molded construction embodiment which is generally designated by the reference numeral 38. This embodiment utilizes a pair of upstanding flange members 40, 42 which are in parallel alignment and which are interconnected by a bottom flat portion 44. Additionally, outwardly extending sloped portions 46, 48 perform the function of preventing vegetation growth proximate a fence with the fencing per se being positionable between the flanges 40, 42.

FIG. 4 illustrates a further embodiment which is generally designated by the reference numeral 50 and which is designed to be attached to an end of a row of fencing wherein such fencing has a circular post. A circular portion 52 extends around the end post and paralleledly aligned flanges 54, 56 extend backwardly towards the fence with downwardly sloped portions constructed in the same manner as in FIG. 3 and designated by the reference numeral 58.

Figure 5:
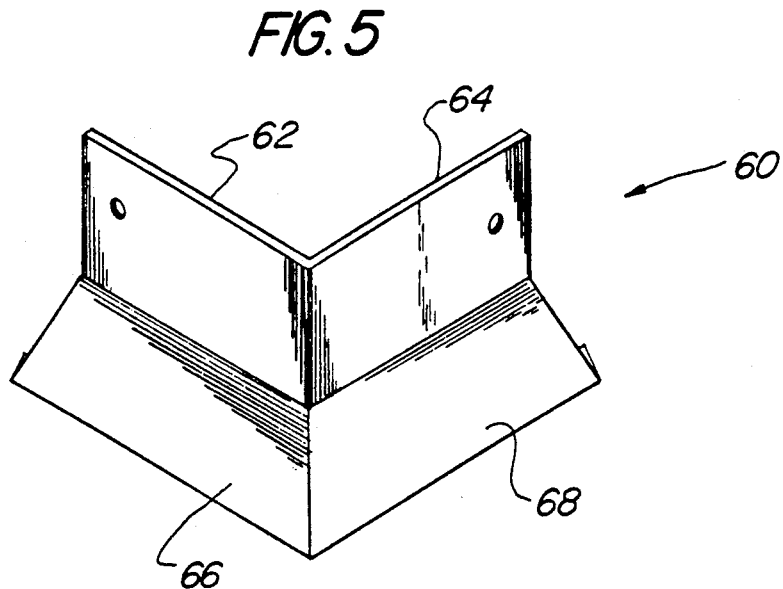
FIG. 5 is a perspective view of a fifth embodiment of the invention.

FIG. 5 illustrates another embodiment which is designated by the reference numeral 60 and which is designed to go around a corner of fencing wherein such fencing does not have a round post. This integral construction includes two orthogonally positioned flange members 62, 64 which are integrally connected and which have respective outwardly sloped portions 66, 68.

Figure 6:
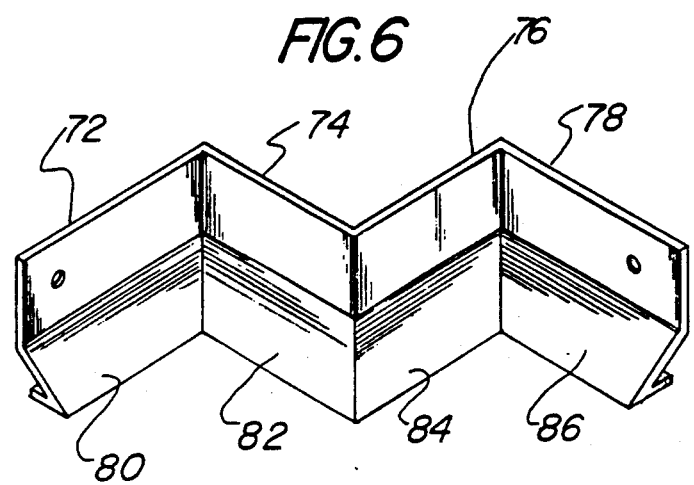
FIG. 6 is a perspective view of a sixth embodiment of the invention.

FIG. 6 illustrates a further embodiment of the invention which is generally designated by the reference numeral 70 wherein this section of vegetation guard includes four flange sections 72, 74, 76, 78 all of which are integrally attached and each has an outwardly sloped portion 80, 82, 84, 86 respectively. This embodiment 70 is utilizable on an interior corner of a fence having a square post.

Figure 7:
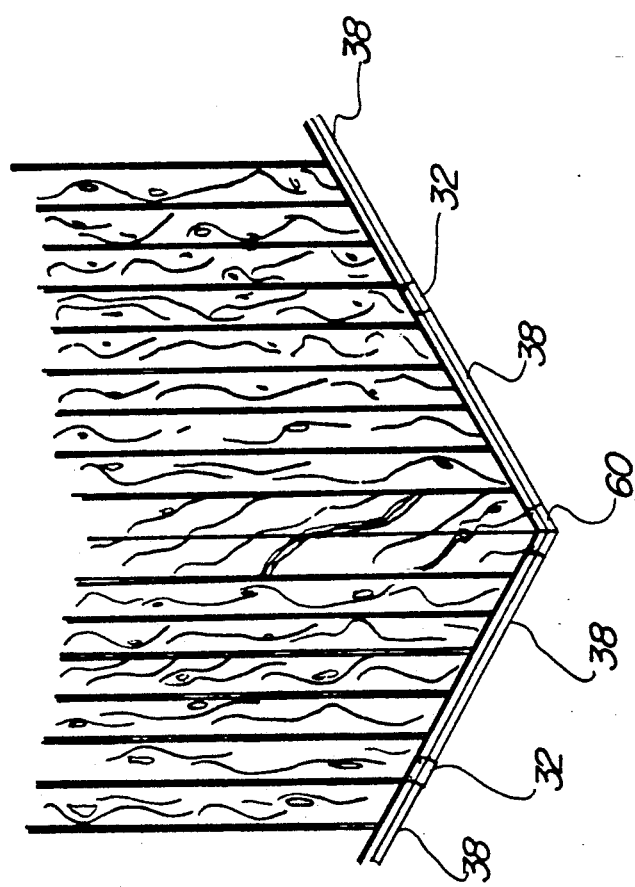
FIG. 7 is a perspective illustration of a manner of attachment of the invention.

With respect to the manner of using each of the described embodiments, the same should be apparent from the above description However, FIGS. 7–10 illustrate how some of the embodiments are attached to fencing. For example, FIG. 7 illustrates a use of embodiment 38 extending along two sides of a wooden fence with the connector embodiment 32 being utilized to join a plurality of the embodiments 38. Similarly, embodiment 60 is then used to facilitate a corner connection of the embodiments 38, 32.

Figure 8:
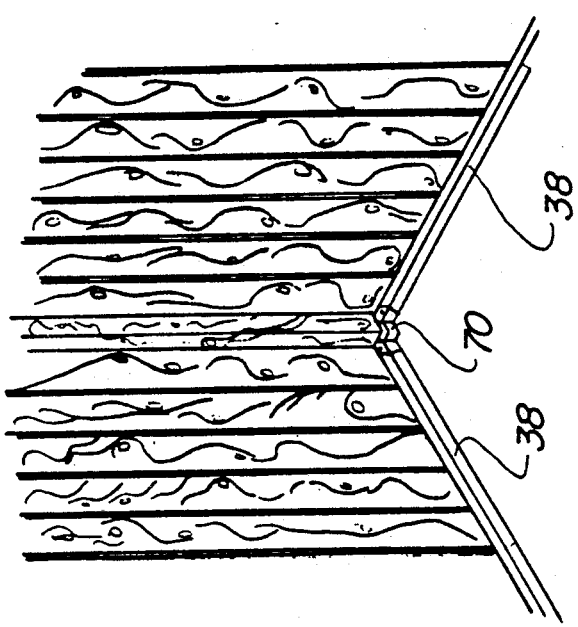
FIG. 8 is a further perspective illustration of a manner of attachment of the invention.

FIG. 8 illustrates the embodiment 38 again extending on an interior side of a wooden fence with the vegetation guard embodiment 70 being utilized to interconnect the embodiments 38 at an interior corner.

Figure 9:
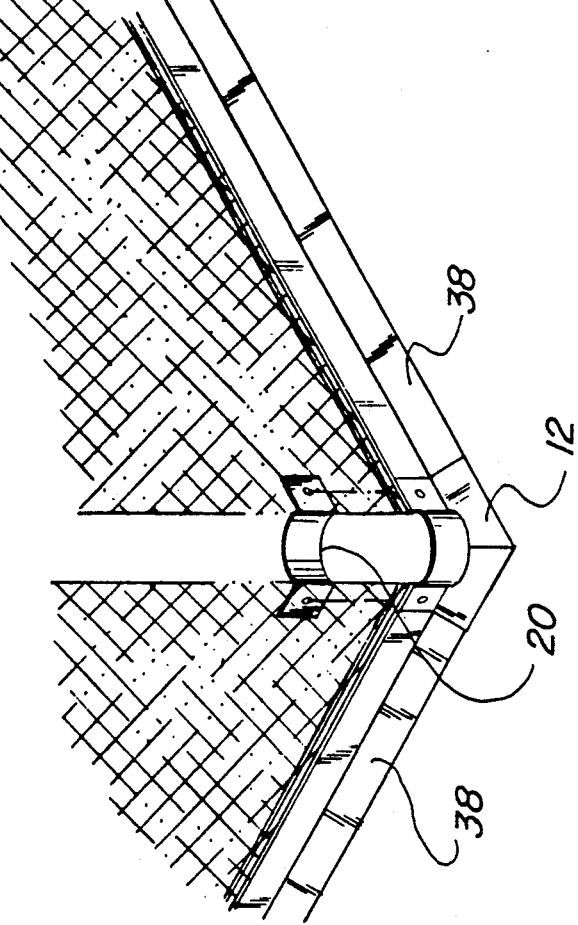
FIG. 9 is a perspective view illustrating a further manner of attachment.
Figure 10:
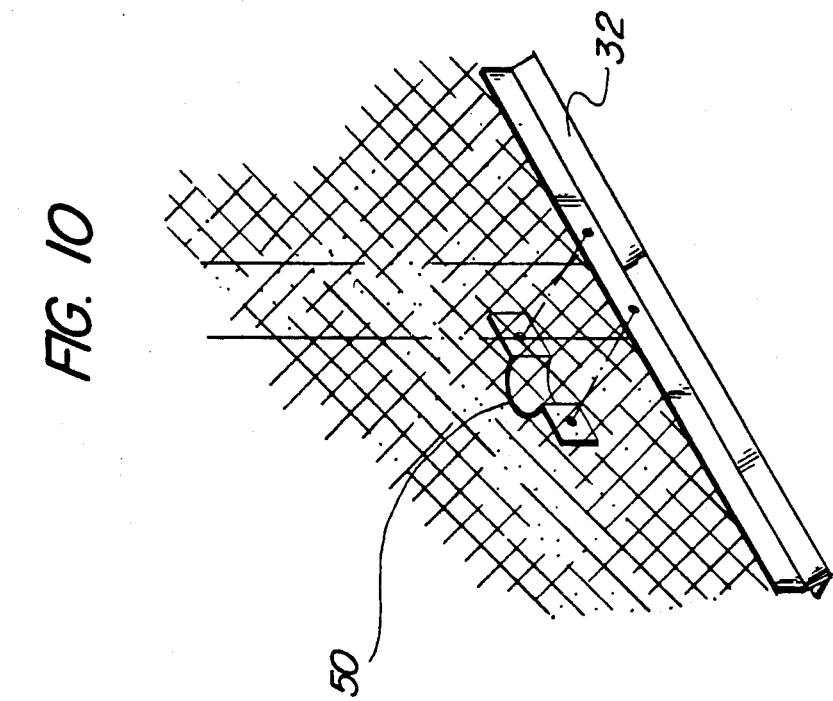
FIG. 10 is a perspective view illustrating even a further manner of attachment.
Figures 11, 12:
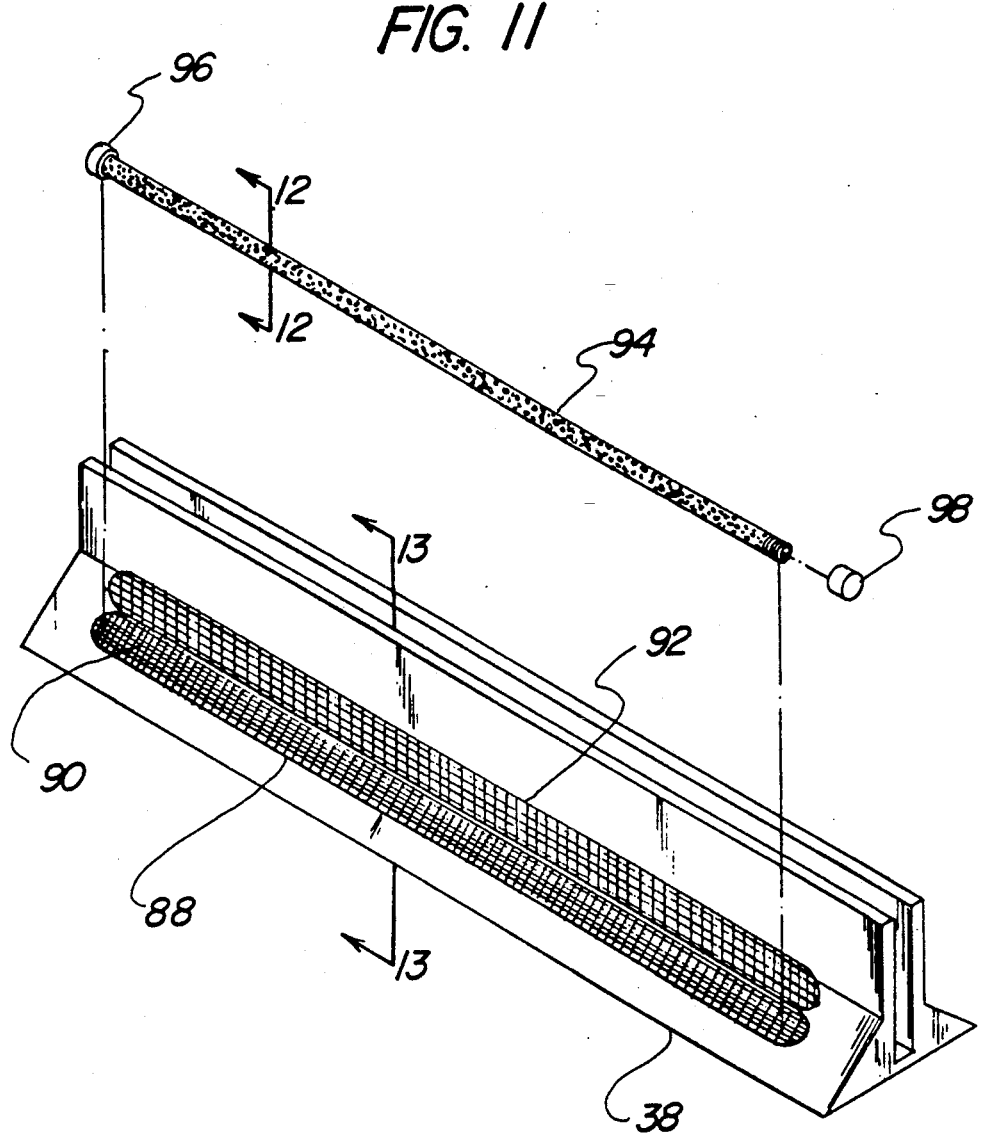
FIG. 11 is a perspective view of a seventh embodiment of the invention.
FIG. 12 is a cross-sectional view of a weed killer holder as viewed along the line 12—12 in FIG. 11.

FIG. 9 illustrates the use of the embodiments 20 on an interior corner and embodiment 12 on an exterior corner with the embodiment 38 again being connected to the embodiments 12, 20. FIG. 10 shows the embodiment 50 bent outwardly so as to conform around an existing fence post and being connectable to a longer section of the embodiment 32.

Figure 13:
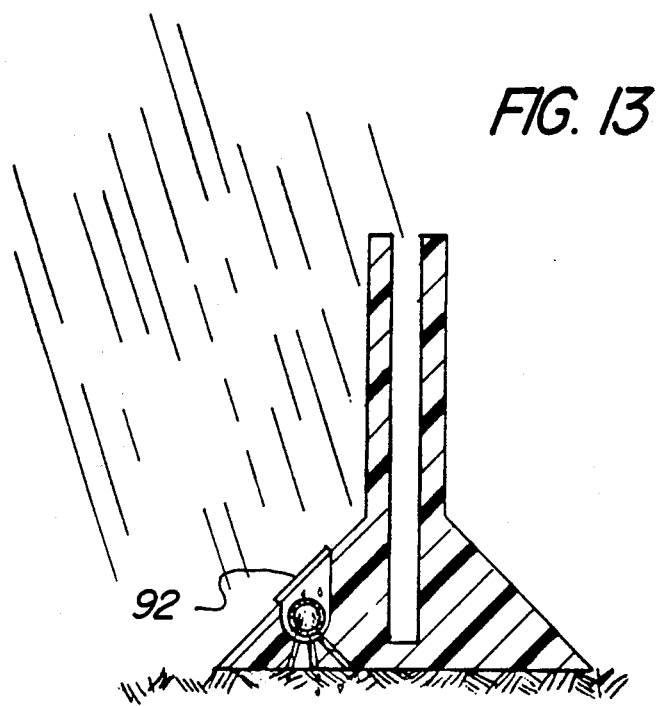
FIG. 13 is a cross-sectional view of the seventh embodiment of the invention as viewed along the line 13—13 in FIG. 11.
Figure 14:
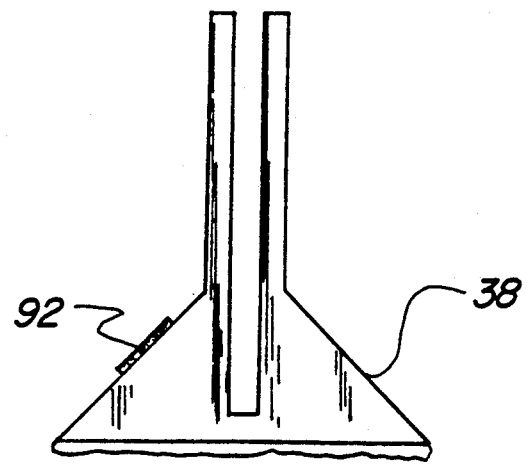
FIG. 14 is an end elevation view of the seventh embodiment of the invention.

FIGS. 11–14 illustrate a modified embodiment of the invention wherein the extended length member 38 is provided with an elongated concavity 88. The elongated concavity 88 has a bottom trough 90 formed of a screened mesh material and a top lid portion 92 which also is formed of a screened material and which is pivotally attached to the trough 90. An extended length of PVC piping 94 having removable end caps 96, 98 is provided with a plurality of small perforations 100. The tube 94 is positionable within the trough 90 and can be filled with a powdered slow dissolving weed killer. As shown in FIG. 13, when it rains, precipitation will drip over the tube 94 and enter the tube through some of the small perforations 100. Small amounts of weed killer will then dissolve and leak out through the apertures 100 so as to slowly spread into the soil and effect a destruction of any germinating weeds and the like.

Figure 15:
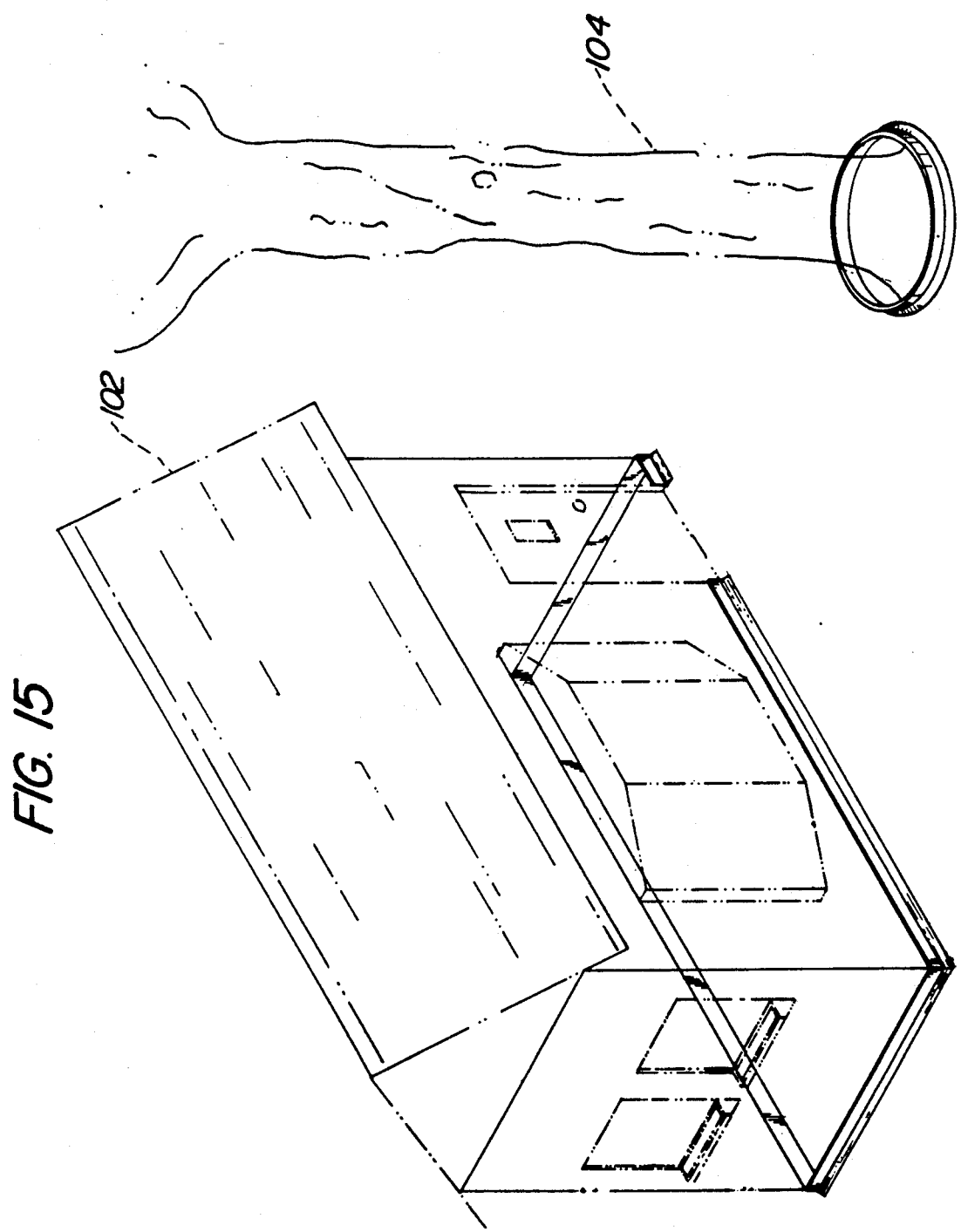
FIG. 15 is a perspective view illustrating two preferred uses of the present invention.

FIG. 15 illustrates the versatility of the present invention wherein the barrier 32 of the type shown in FIG. 2 is aligned around the periphery of a house 102 or a tree 104. It is also within the intent and purview of the present invention to utilize the reinforced form of the barrier 38 shown in FIG. 3 wherein this form of the barrier would be split along its longitudinal length. More specifically, the connection ridge 44 would be removed so as to form two split apart sections, each of which would be similar in design to the barrier 32 with the exception that reinforced ribbing would be located along a bottom sloped edge thereof as illustrated in FIG. 3. This modified form of the barrier 38 would then be positionable around a house 102 or tree 104 as shown in FIG. 15.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fence vegetation guard comprising:
    barrier means positionable along and beneath a bottom edge of an existing fence;
    fastening means for attaching said barrier means together, thereby preventing its removal from said fence; and
    sloped surface means extending outwardly from said barrier means, said sloped surface means interfering with vegetation growth beneath said fence and serving as a guide for lawn mowers, weed cutters and the like;
    further including a weed killing dispenser associated with said vegetation barrier, said weed killing dispenser comprising at least one weed killing holder having a plurality of perforations therein, said holder being attachable to said vegetation barrier, and
    further wherein said weed killer holder is retained in a trough formed in said vegetation barrier.

2. A new and improved fence vegetation guard comprising in combination:
    barrier means adapted to be positioned along and beneath the bottom edge of a fence having at least one angle therein, said barrier means comprising a plurality of separate substantially straight sections of predetermined longitudinal extent, respectively, each of said sections having a first portion adapted to be fastened to said fence proximal to said bottom edge and a second portion integral therewith, said second portion extending outwardly from said first section to define a sloped surface adapted to prevent vegetation growth beneath said bottom edge of said fence and to serve as a guide for lawn mowers, weed cutters or the like,
    corner attachment means for connecting a pair of said separate sections together at an angle to each other and to separate corresponding sections of said fence disposed in the region of said angle.
    end attachment means for connecting at least one of said sections to a fence post, and
    fastener means for connecting said sections, said corner attachment means and said post attachment means together and to said fence along substantially the entire bottom edge of said fence.

3. The combination of claim 2 wherein said corner attachment means comprises a first portion adapted to be fastened to said fence, a second portion integral with said first portion and extending outwardly therefrom to define a sloping surface adapted to prevent vegetation growth beneath said bottom edge of said fence and to serve as a guide for lawn mowers, weed cutters or the like, said first and second portions having a crease therein to define an angle extending transversely with respect to said bottom edge of said fence, and means on said first portion for cooperating with said fastening means to fasten said corner attachment means to said fence in the region thereof defined by said at least one angle.

4. The combination of claim 3 wherein said angle is a right angle.

5. The combination of claim 3 wherein said corner attachment means first portion includes a curvilinear section intermedially thereof to accommodate a fence post having an annular cross-sectional shape.

6. The combination of claim 3 wherein said end attachment means first portion and said end attachment second portion are intermedially divided by a transverse curvilinear section thereby to define a pair of opposed, spaced apart barrier sections joined to said curvilinear section at the same corresponding end thereof, respectively, such that an end post of said fence having an annular cross-sectional shape is adapted to be fitted in said curvilinear section and said opposed, spaced apart barrier sections are adapted to be fastened to adjoining sections of said fence by said fastening means.

* * * * *